(12) United States Patent
Gilliland et al.

(10) Patent No.: US 11,738,879 B2
(45) Date of Patent: *Aug. 29, 2023

(54) STOWABLE WING AIRCRAFT WITH DUAL, FUSELAGE-MOUNTED ENGINES

(71) Applicant: Textron Innovations Inc., Providence, RI (US)

(72) Inventors: Colton Gilliland, Northlake, TX (US); David Bockmiller, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/554,154

(22) Filed: Dec. 17, 2021

(65) Prior Publication Data
US 2022/0106054 A1  Apr. 7, 2022

Related U.S. Application Data

(62) Division of application No. 15/975,738, filed on May 9, 2018, now Pat. No. 11,230,388.

(51) Int. Cl.
*B64D 35/08* (2006.01)
*B64C 27/28* (2006.01)
*B64D 35/04* (2006.01)

(52) U.S. Cl.
CPC .............. *B64D 35/08* (2013.01); *B64C 27/28* (2013.01); *B64D 35/04* (2013.01)

(58) Field of Classification Search
CPC .......... B64D 35/08; B64D 35/04; B64C 27/28
See application file for complete search history.

(56) References Cited

U.S. PATENT DOCUMENTS

| | | | |
|---|---|---|---|
| 3,430,894 | A | 3/1969 | Levinsky |
| 3,999,726 | A | 12/1976 | Carlson et al. |
| 9,199,732 | B2 | 12/2015 | Isaac et al. |
| 9,701,406 | B2 | 7/2017 | Robertson et al. |
| 11,230,388 | B2 | 1/2022 | Gilliland et al. |
| 2014/0263854 | A1 | 9/2014 | Ross |
| 2015/0048213 | A1 | 2/2015 | Ross et al. |
| 2017/0158323 | A1 | 6/2017 | Ross et al. |
| 2018/0079484 | A1 | 3/2018 | Ross et al. |
| 2018/0079487 | A1 | 3/2018 | Ivans et al. |

(Continued)

FOREIGN PATENT DOCUMENTS

EP 3299279 A1 3/2018

OTHER PUBLICATIONS

Restriction Requirement, dated Jun. 17, 2020, by the USPTO, regarding U.S. Appl. No. 15/975,738.

(Continued)

*Primary Examiner* — Jessica B Wong
(74) *Attorney, Agent, or Firm* — Timmer Law Group, PLLC

(57) ABSTRACT

An embodiment of the present invention provides an aircraft that includes a fuselage and a rotatable wing disposed above the fuselage. At least one cross-wing driveshaft is disposed within the wing and is driven in rotation by a drive system connected to first and second engines that are located at respective sides of the fuselage beneath the wing. The drive system is so configured that one or both of the first engine and the second engine can drive the at least one cross-wing driveshaft in the event of failure of an engine.

14 Claims, 11 Drawing Sheets

(56) References Cited

U.S. PATENT DOCUMENTS

2018/0079503 A1 3/2018 Ivans
2018/0080380 A1 3/2018 Simonetti

OTHER PUBLICATIONS

Office Action, dated Sep. 16, 2020, by the USPTO, regarding U.S. Appl. No. 15/975,738.
Final Rejection, dated Jan. 13, 2021, by the USPTO, regarding U.S. Appl. No. 15/975,738.
Office Action, dated May 20, 2021, by the USPTO, regarding U.S. Appl. No. 15/975,738.
Notice of Allowance, dated Sep. 15, 2021, by the USPTO, regarding U.S. Appl. No. 15/975,738.

STOWABLE WING AIRCRAFT WITH DUAL, FUSELAGE-MOUNTED ENGINES

CROSS-REFERENCE TO RELATED APPLICATION

This application is a divisional of U.S. patent application Ser. No. 15/975,738, filed May 9, 2018. The disclosure of which is hereby incorporated by reference.

BACKGROUND

Technical Field

The present disclosure relates to aircraft, in particular, to tiltrotor aircraft having dual, fuselage-mounted engines drivingly connected to rotor systems disposed on a stowable wing.

Description of Related Art

A certain traditional aircraft, such as a Bell V-247 unmanned aerial vehicle, includes one main engine mounted within the fuselage to generate aerodynamic lift to support the weight of the rotorcraft in flight and thrust to counteract aerodynamic drag and move the rotorcraft in forward flight. Mounting of the main engine within the fuselage was deemed desirable to simplify rotor pylon and nacelle configuration, reduce space constraints, and/or reduce aircraft moment of inertia for improved maneuverability. However, use of a single main engine within the fuselage can be disadvantageous in that there is a lack of engine redundancy in the event of engine failure, a lack of engine power, and limited fuselage interior space.

In certain other tiltrotor aircraft including other unmanned aerial vehicles, there is a desire to provide for compact stowing of the tiltrotor aircraft for transportation, for example, in a standard cargo container. To this end, a tiltrotor aircraft that can be stowed to a compact package that fits in a standard cargo container is described in US Publication No. 2018/0079484 A1. This tiltrotor aircraft includes a single main engine within the fuselage, a stowable wing that can be rotated to a stowed position overlying the fuselage, and optional folding wing extensions. Access to the single main engine within the fuselage can be difficult for maintenance and inspection, which are critical for the operation of the aircraft.

Due to the size and weight of conventional combustion engines, the location and the number of engines greatly influences the location of the aircraft center of gravity (CG). When an aircraft is certified by governmental authorities, the CG field, size, and location are certified and specified. The aircraft, once certified, cannot legally be operated with loads such that the CG is outside the certified field. During the conventional design process, the CG of the aircraft may be modified several times requiring redesign of aircraft components (e.g. drive and engine systems), which can be a slow and laborious process taking hundreds or thousands of hours of engineering.

There is a need for tiltrotor aircraft that overcomes the above disadvantages associated with use of a single main engine within the fuselage and that can be reconfigured to a compact stowable package that fits within a cargo container.

SUMMARY

In a first aspect, there is provided an aircraft including: a fuselage; a rotatable wing disposed above the fuselage; at least one cross-wing driveshaft disposed within the wing; a first engine and a second engine disposed beneath the wing and associated with the fuselage; and a drive system between the first engine and the second engine and the at least one cross-wing driveshaft; wherein the drive system is so configured that one or both of the first engine and the second engine can drive the at least one cross-wing driveshaft.

In an embodiment, the drive system includes a combining gearbox disposed inside the fuselage and connected to a first engine driveshaft and a second engine driveshaft by a respective first coupling shaft and second coupling shaft, the combining gearbox including a riser shaft.

In another embodiment, the drive system further includes a mid-wing gearbox connected between the riser shaft and the at least one cross-wing driveshaft.

In still another embodiment, the mid-wing gearbox is a power splitting gearbox disposed between the riser shaft and the at least one cross-wing driveshaft.

In yet another embodiment, at least one of the first coupling shaft and the second coupling shaft define an angle with the riser shaft from about 0 degrees to about 180 degrees relative to the transverse axis of the aircraft.

In an embodiment, the at least one of the first coupling shaft and the second coupling shaft define an angle with the riser shaft from about 0 degrees to about 180 degrees relative to the longitudinal axis of the aircraft.

In yet another embodiment, the wing is rotatable about a wing rotation axis.

In an exemplary embodiment, the riser shaft of the combining gearbox is disposed along a wing rotation axis.

In an embodiment, at least a portion of the respective first engine and the second engine are located externally at opposite sides of the fuselage.

In still another embodiment, the first engine and second engine are mounted on a support frame attached to the fuselage.

In an embodiment, the first engine and the second engine are symmetrically disposed relative to a zero butt line of the aircraft.

In yet another embodiment, the first coupling shaft and the second coupling shaft are symmetrically disposed relative to a zero butt line.

In an embodiment, the aircraft is a tiltrotor aircraft.

In another embodiment, the aircraft is an unmanned aerial vehicle.

In a second aspect, there is provided an aircraft including: a fuselage; a rotatable wing disposed above the fuselage, the wing being rotatable between a stowed position in substantial alignment with and over the fuselage and flight position substantially perpendicular to the fuselage; at least one cross-wing driveshaft disposed within the wing; a first engine and a second engine located at a respective right side and left side of the fuselage beneath the wing; and a drive system between the first engine and the second engine and the at least one cross-wing driveshaft. The drive system includes a combining gearbox that is disposed inside the fuselage and that is connected to a first engine driveshaft and a second engine driveshaft by a respective first coupling shaft and second coupling shaft, the combining gearbox including a riser shaft; and a mid-wing gearbox connected between the riser shaft and the at least one cross-wing driveshaft.

In an embodiment, the first coupling shaft and the second coupling shaft define an included angle with the riser shaft from about 0 degrees to about 180 degrees relative to the transverse axis of the aircraft.

In yet another embodiment, the first coupling shaft and the second coupling shaft define an included angle with the riser shaft from about 0 degrees to about 180 degrees relative to the longitudinal axis of the aircraft.

In still another embodiment, at least a portion of the respective first engine and the second engine are located externally at opposite sides of the fuselage.

In an exemplary embodiment, the first engine and the second engine are symmetrically disposed relative to a zero butt line of the aircraft.

In another embodiment, the first coupling shaft and the second coupling shaft are symmetrically disposed relative to a zero butt line.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
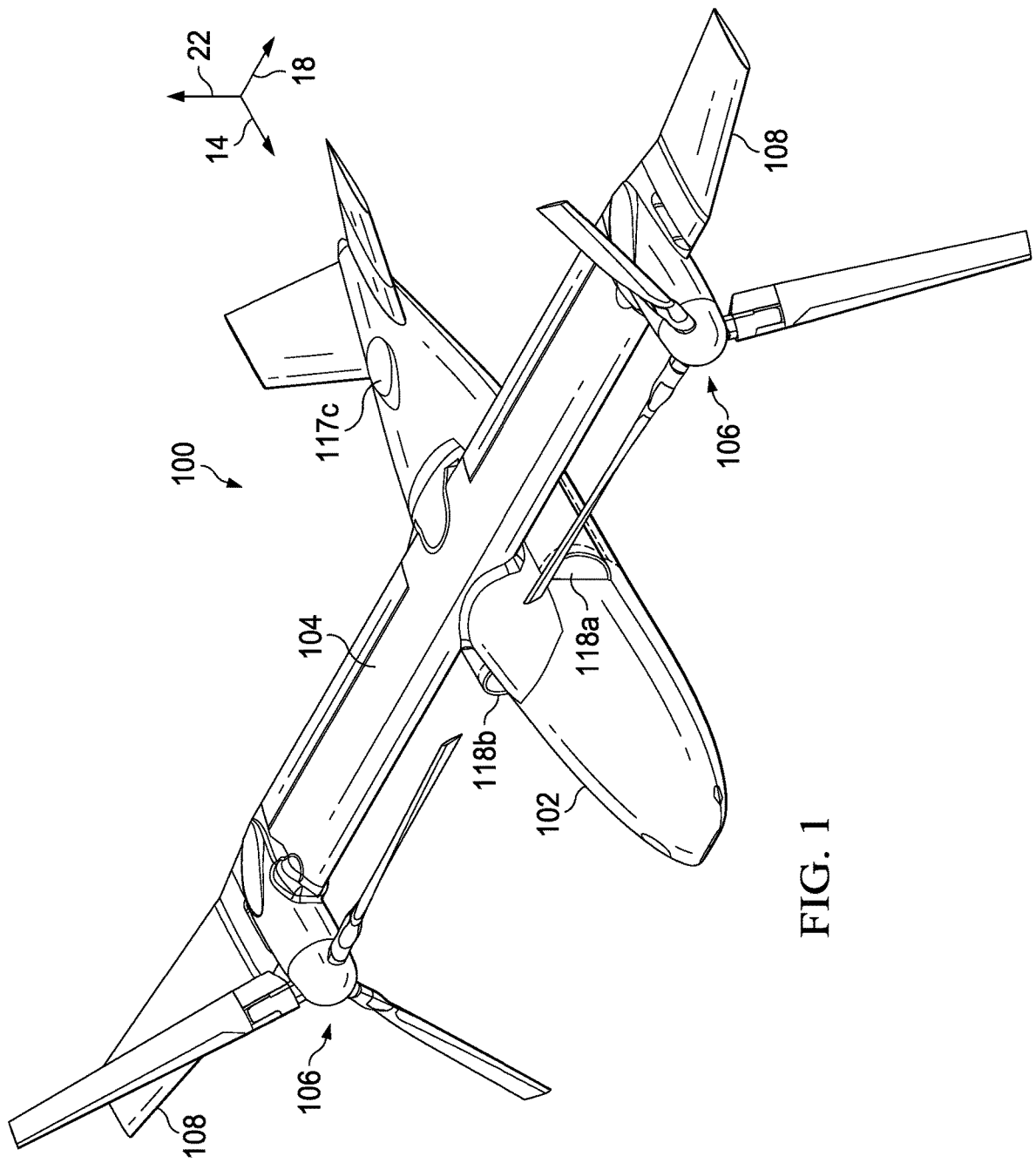
FIG. 1 is an oblique top right view of an aircraft according to the disclosure with the aircraft in a cruise configuration.

Illustrative embodiments of a stowable wing aircraft with dual, fuselage-mounted engines and methods therefor are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

Practice of embodiments of the present invention provide significant advantages over stowable tiltrotor aircraft having a single main engine within the fuselage. In particular, tiltrotor aircraft pursuant to certain embodiments include a fuselage, a rotatable wing disposed above the fuselage, and first and second engines that are located at respective sides of the fuselage beneath the wing to power a drive system that is so configured that one or both of the first engine and the second engine can drive the cross-wing driveshaft in the event of an engine failure. Further discussion and illustration of these features are provided below.

This disclosure depicts and describes certain stowable tiltrotor aircraft including, but not limited to, unmanned aerial vehicles (UAV's), drones, personal air vehicles, and other vertical lift or VTOL aircrafts. Further, any features of one embodiment of the stowable tiltrotor aircraft in this disclosure can be used with any other embodiment of the stowable tiltrotor aircraft such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Figure 2:
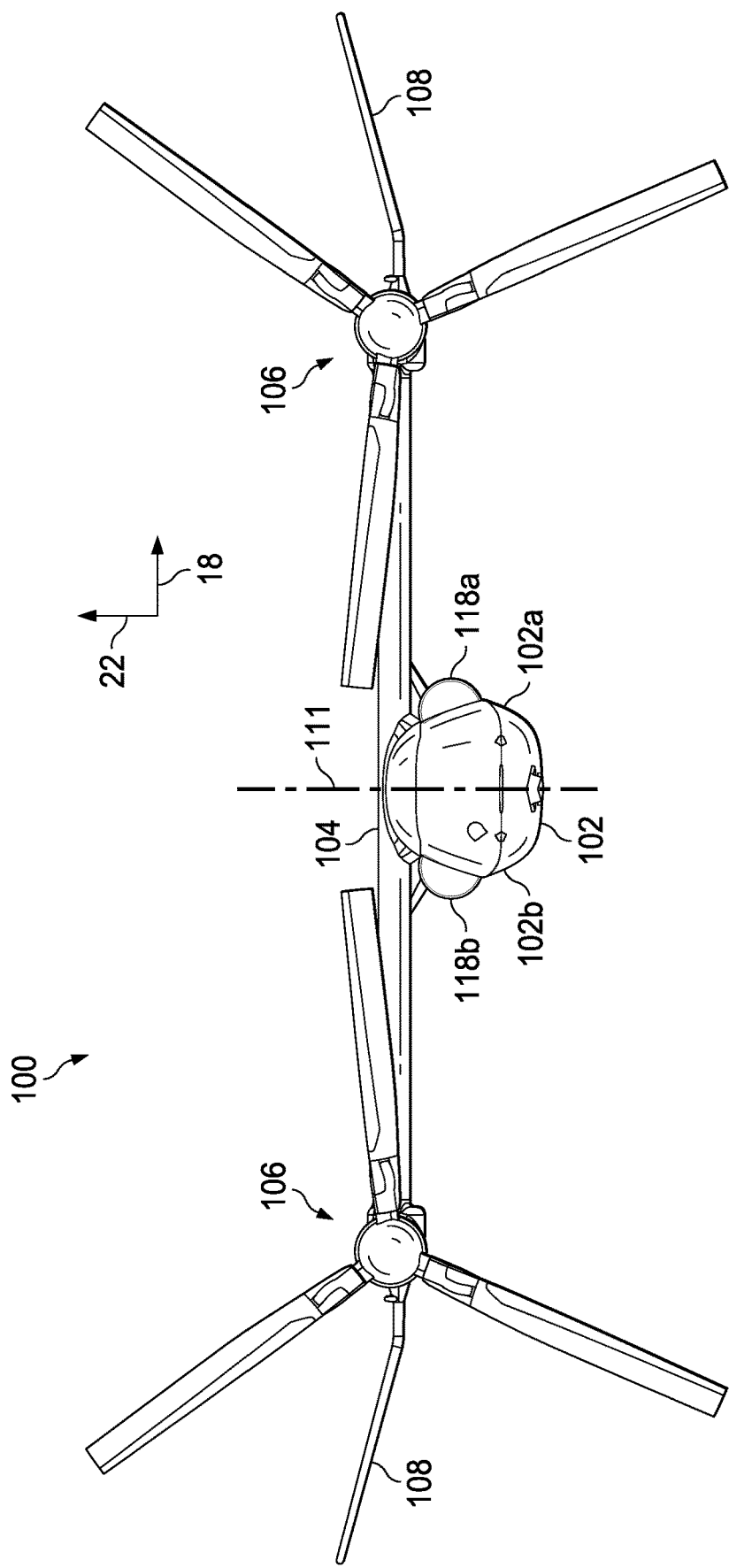
FIG. 2 is a front view of the aircraft of FIG. 1 in a cruise configuration.
Figure 3:
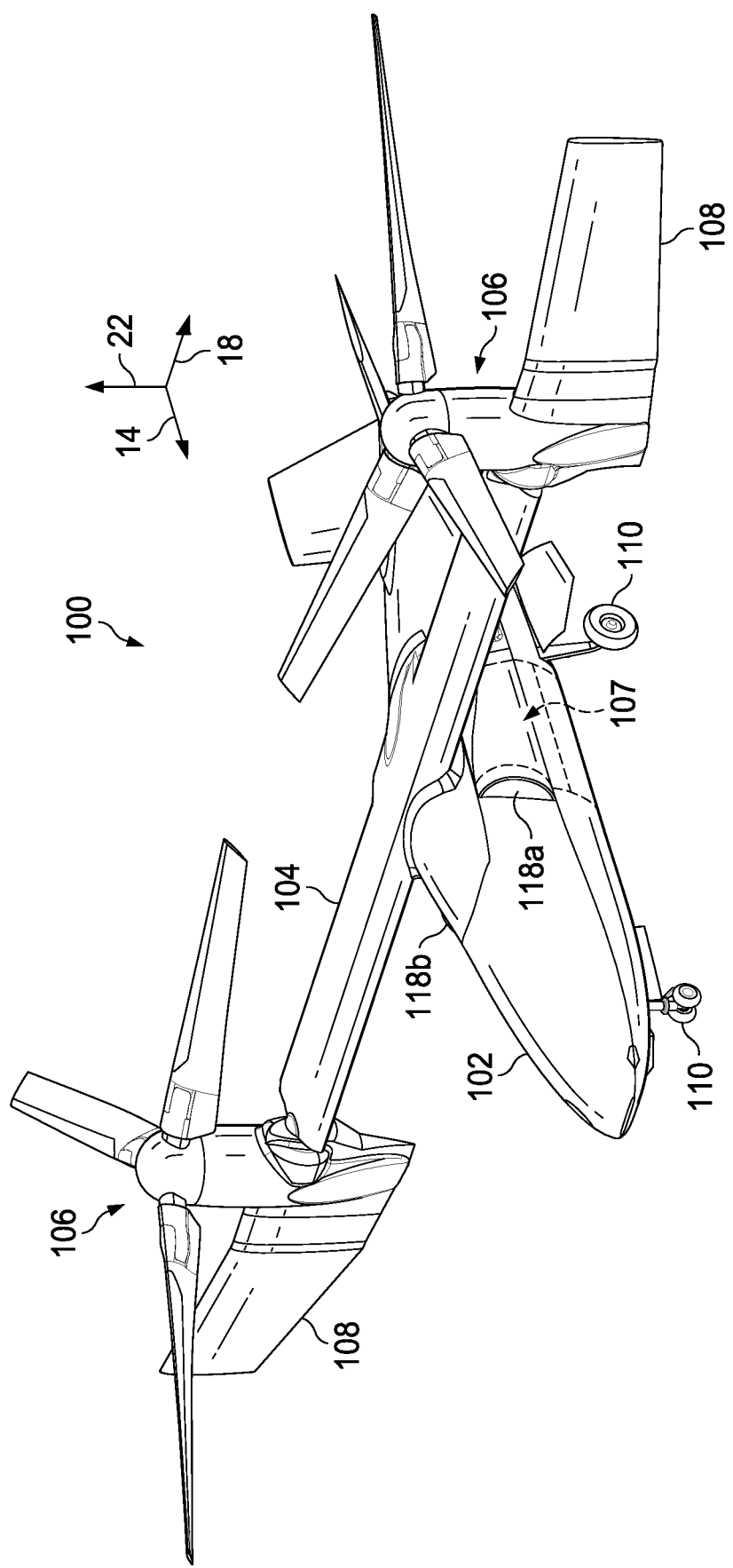
FIG. 3 is an oblique top right view of the aircraft of FIG. 1 with the aircraft in a vertical takeoff and landing (VTOL) configuration.
Figure 4:
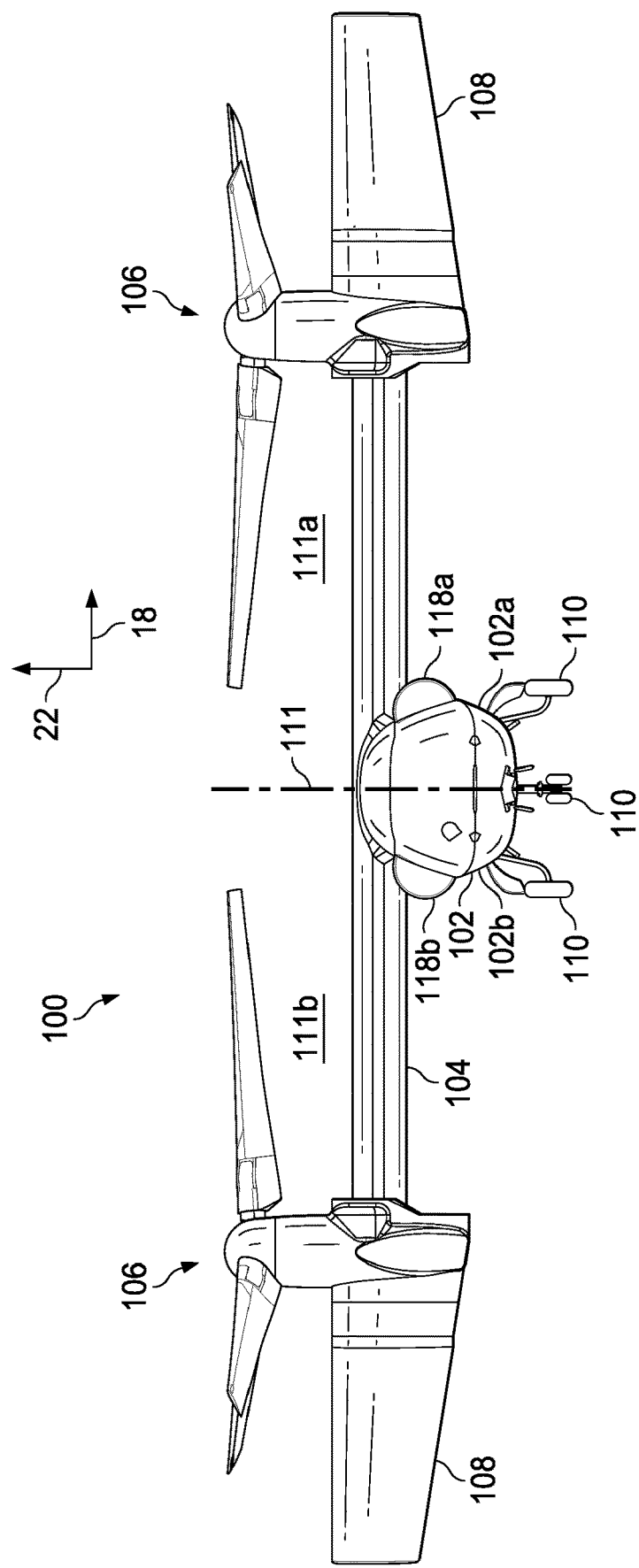
FIG. 4 is a front view of the aircraft of FIG. 1 with the aircraft in a VTOL configuration.

Referring to FIGS. 1-7 in the drawings, a tiltrotor aircraft 100 is illustrated. The aircraft 100 comprises a tiltrotor unmanned aerial vehicle (UAV) for purposes of illustration and not limitation. The aircraft 100 comprises a fuselage 102, a rotatable wing 104, rotor systems 106, foldable wing extensions 108, and landing gear 110. The aircraft 100 is generally operable in a cruise mode as shown in FIGS. 1 and 2 in which the aircraft 100 orients the rotor systems 106 and wing extensions 108 to allow flight in a manner substantially similar to a fixed wing aircraft. The aircraft 100 is also operable in a vertical takeoff and landing (VTOL) mode as shown in FIGS. 3-4 in which the aircraft 100 orients the rotor systems 106 and wing extensions 108 to allow vertical takeoff and landing in a manner substantially similar to a helicopter. In this embodiment, the aircraft 100 can also operate in a transition mode in which the rotors systems 106 and wing extensions 108 are oriented in positions between the positions shown in the cruise mode and the VTOL mode.

Figure 5:
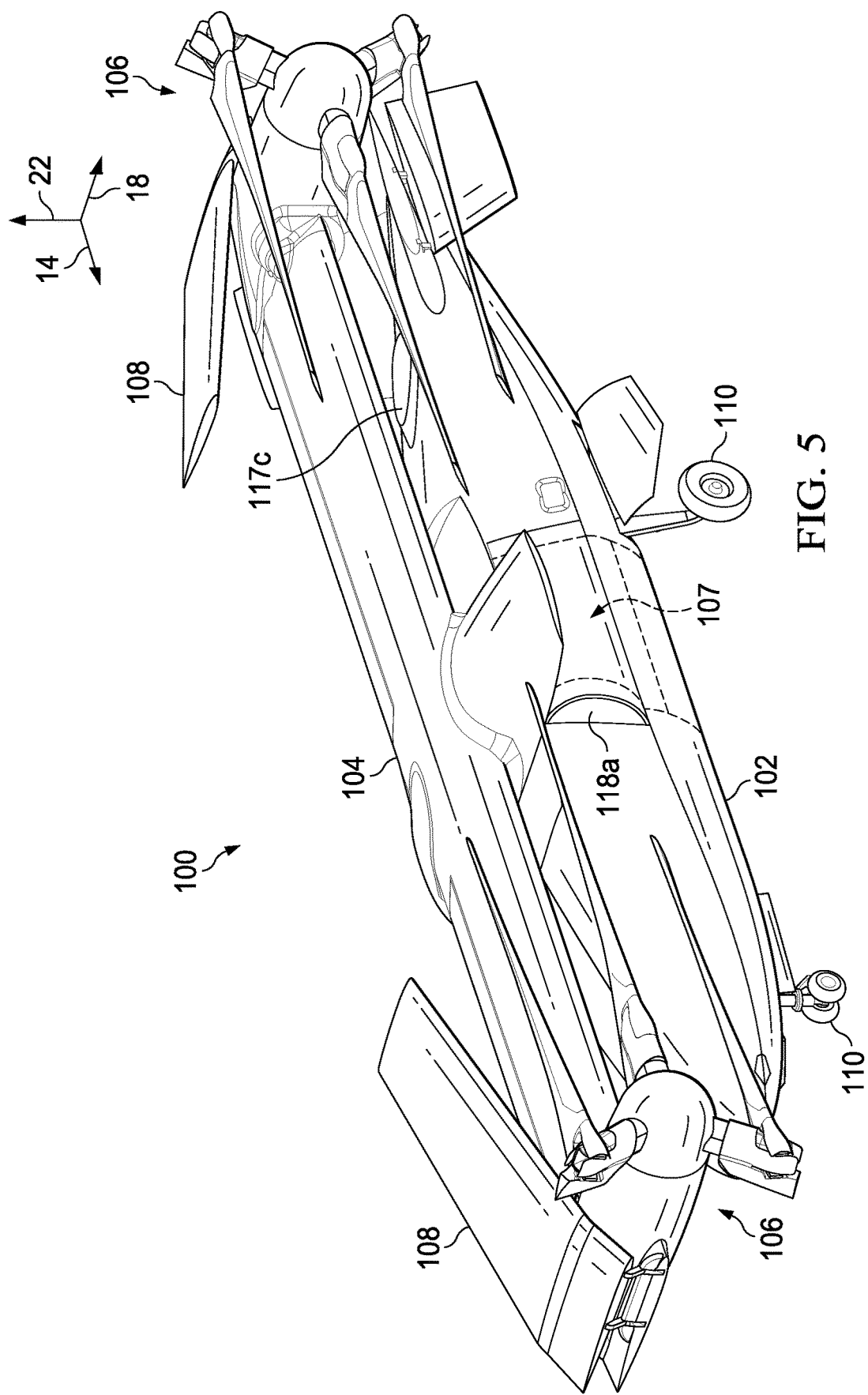
FIG. 5 is an oblique top right view of the aircraft of FIG. 1 with the aircraft in a folded configuration.
Figure 6:
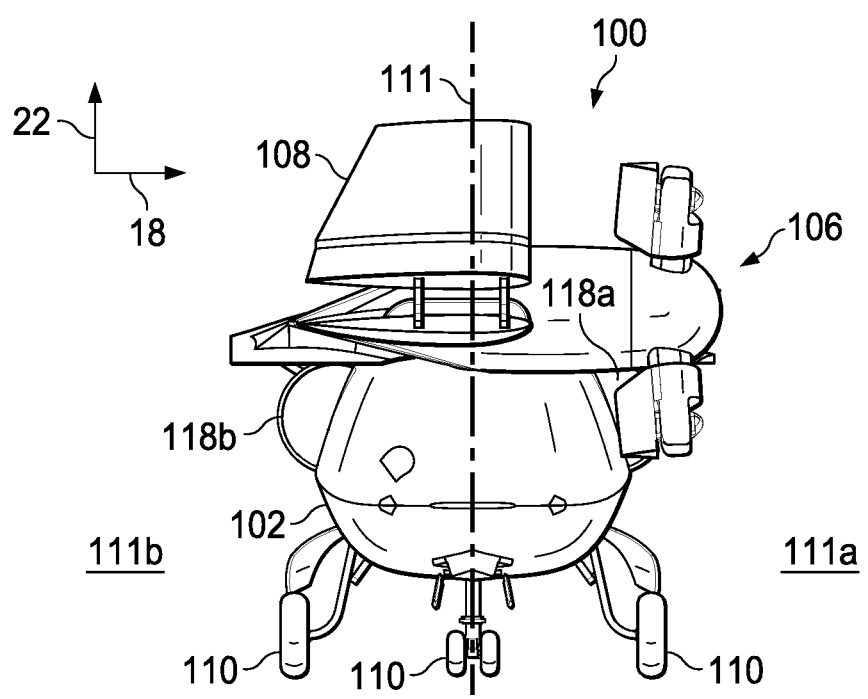
FIG. 6 is a front view of the aircraft of FIG. 1 with the aircraft in a folded configuration.
Figure 7:
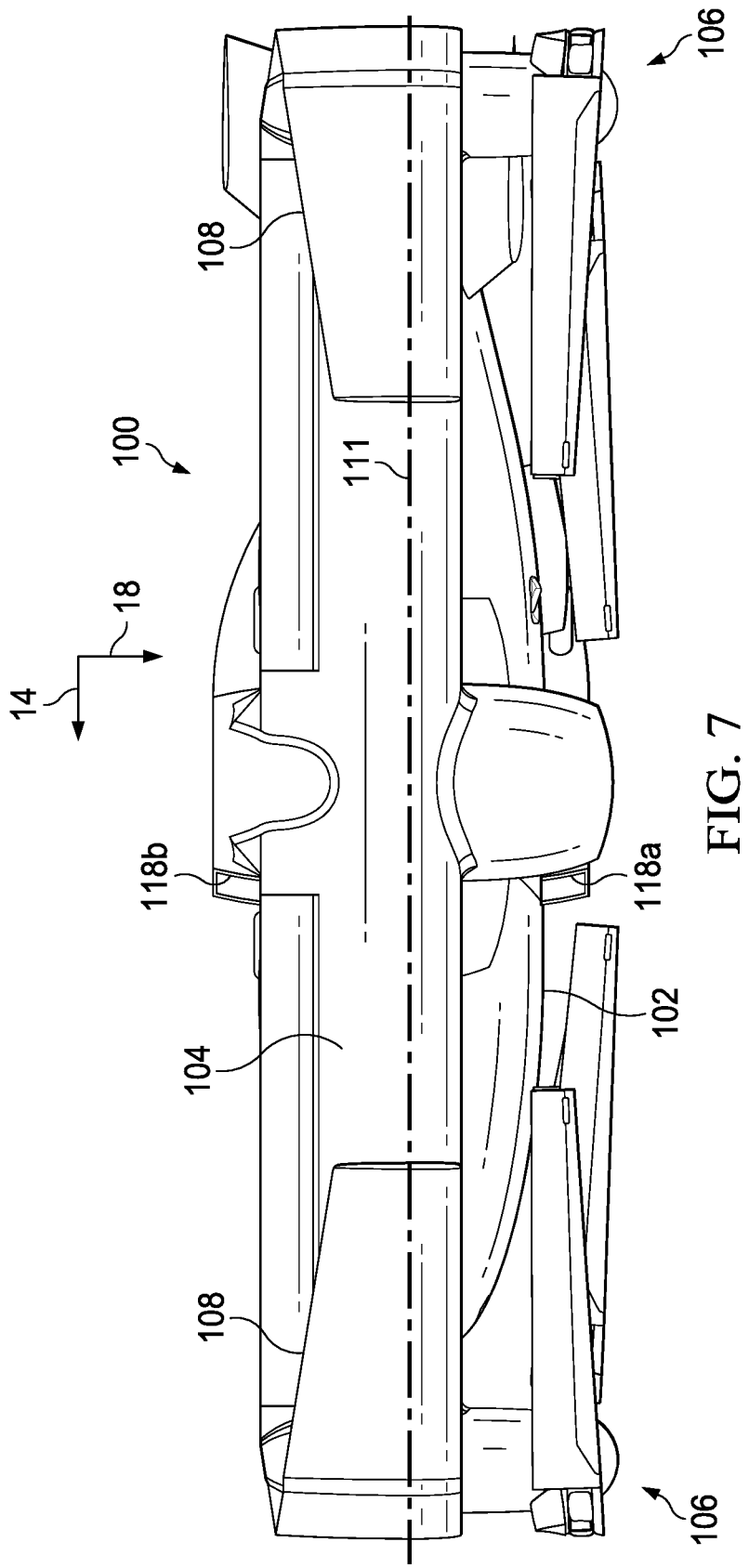
FIG. 7 is a top view of the aircraft of FIG. 1 with the aircraft in a folded configuration.
Figure 8:
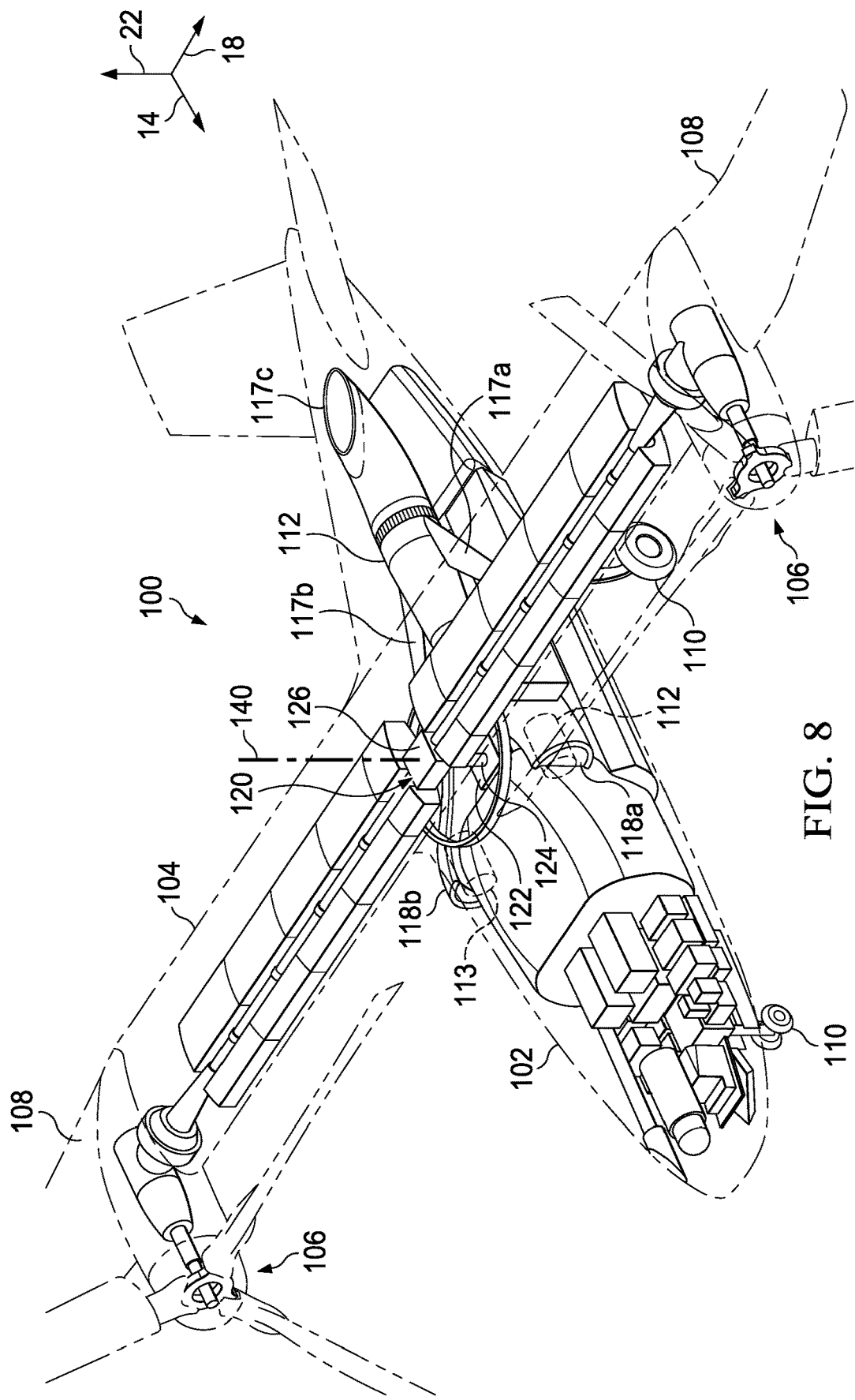
FIG. 8 is a partial oblique top right view of the aircraft of FIG. 1 showing internal components of the aircraft.

The aircraft 100 can be configured to a stowed position by rotating the rotatable wing 104 about a wing rotation axis to a stowed position overlying a portion of the length of the fuselage, shown in FIGS. 5-7. In the stowed position with the wing extensions 108 folded, the aircraft 100 is configured (folded) to a compact stowable package that fits within a standard cargo container; e.g. having a height of 96 inches, a width of 96 inches, and a depth of 240 inches. The tails can be folded to this same end as well, FIG. 5. To reconfigure the stowed aircraft for use in a service application, the aircraft 100 is removed from the cargo container, the wing 104 then is rotated to a flight position, FIGS. 1-2 or FIGS. 3-4, where the wing is locked in position. The wing extensions 108 and tail, if used, are unfolded to the flight position and locked in position. While aircraft 100 is shown as comprising a rotatable wing 104 with wing extensions 108, alternative aircraft embodiments may not include wing extensions 108. More specifically, in some embodiments, an aircraft may be provided that comprises a rotatable wing but does not comprise wing extensions.

FIGS. 1 and 3 depict three mutually orthogonal directions X, Y, and Z forming a three-dimensional frame of reference XYZ. Longitudinal axis X 14 corresponds to the roll axis that extends through the center of aircraft 100 in the fore and after directions. Transverse axis Y 18 is perpendicular to longitudinal axis 14 and corresponds to the pitch axis (also known as a control pitch axis or "CPA"). The X-Y plane is considered to be "horizontal." Vertical axis Z 22 is the yaw axis and is oriented perpendicularly with respect to the X-Y plane. The X-Z plane and Y-Z plane are considered to be "vertical." FIGS. 2 and 4-12 include legends of the three-dimensional frame of reference XYZ.

Referring now to FIGS. 8-12, the aircraft 100 further comprises fuselage-mounted first and second engines 112, 113 connected to a drive system 120 for driving the associated rotor systems 106. The first and second engines 112, 113 are associated with the respective opposite right and left sides 102a, 102b of the fuselage 102 beneath the rotatable wing 104 to permit rotation about the wing rotation axis 140. In this embodiment, the rotatable wing 104 can rotate about the wing rotation axis 140 that is generally coincident with a central axis of a riser shaft 124. Access panels 107 (one access panel 107 shown on the right side 102a in FIGS. 3 and 5) disposed on the right and left sides 102a, 102b of the fuselage 102 permit access to the first and second engines 112, 113 and the drive system 120. The access panels 107 are movable between an open position (not shown) to permit maintenance and inspection of components associated with the respective engine 112, 113 and closed position (shown) so that the engine 112, 113 and drive system 120 are covered and protected from the elements.

In an embodiment, the first and second engines 112, 113 associated with the opposite sides 102a, 102b of the fuselage 102 can be saddle mounted on a support frame comprised of a truss frame in the fuselage 102 and/or the airframe of the fuselage 102. In an exemplary embodiment, the first and second engines 112,113 are disposed on and configured to extend externally from the right and left sides 102a, 102b of the fuselage 102 to increase fuselage interior space and to improve access for engine maintenance. In an embodiment, the first and second engines 112, 113 extend externally at least partially from the right and left sides 102a, 102b of the fuselage 102. In an embodiment, the first and second engines 112, 113 are disposed substantially symmetrically in the left-right direction about a zero butt line 111 of the aircraft 100. The zero butt line 111 generally bisects the aircraft 100 into left and right lateral portions.

Some or all of the first and second engines 112, 113 may be a liquid fuel powered engine such as gasoline, jet fuel, or diesel powered engines including rotary engines such as dual rotor or tri rotor engines or other high power-to-weight engines. Each first and second engine 112, 113 can include an air intake 118a, 118b which typically are located at least partially externally of the right and left sides 102a, 102b of the fuselage as shown. The air intake 118a, 118b of each engine 112, 113 are disposed substantially symmetrically in the left-right direction about the zero butt line 111. In an embodiment shown in FIG. 8, exhaust from first and second engines 112, 113 exits into respective first and second exhaust ducts 117a, 117b. In an exemplary embodiment, the first and second exhaust ducts 117a, 117b are disposed symmetrically about the zero butt line 111 and converge into an exhaust outlet 117c. The exhaust outlet 117c is disposed in the fuselage 102 along the zero butt line 111.

Figure 10:
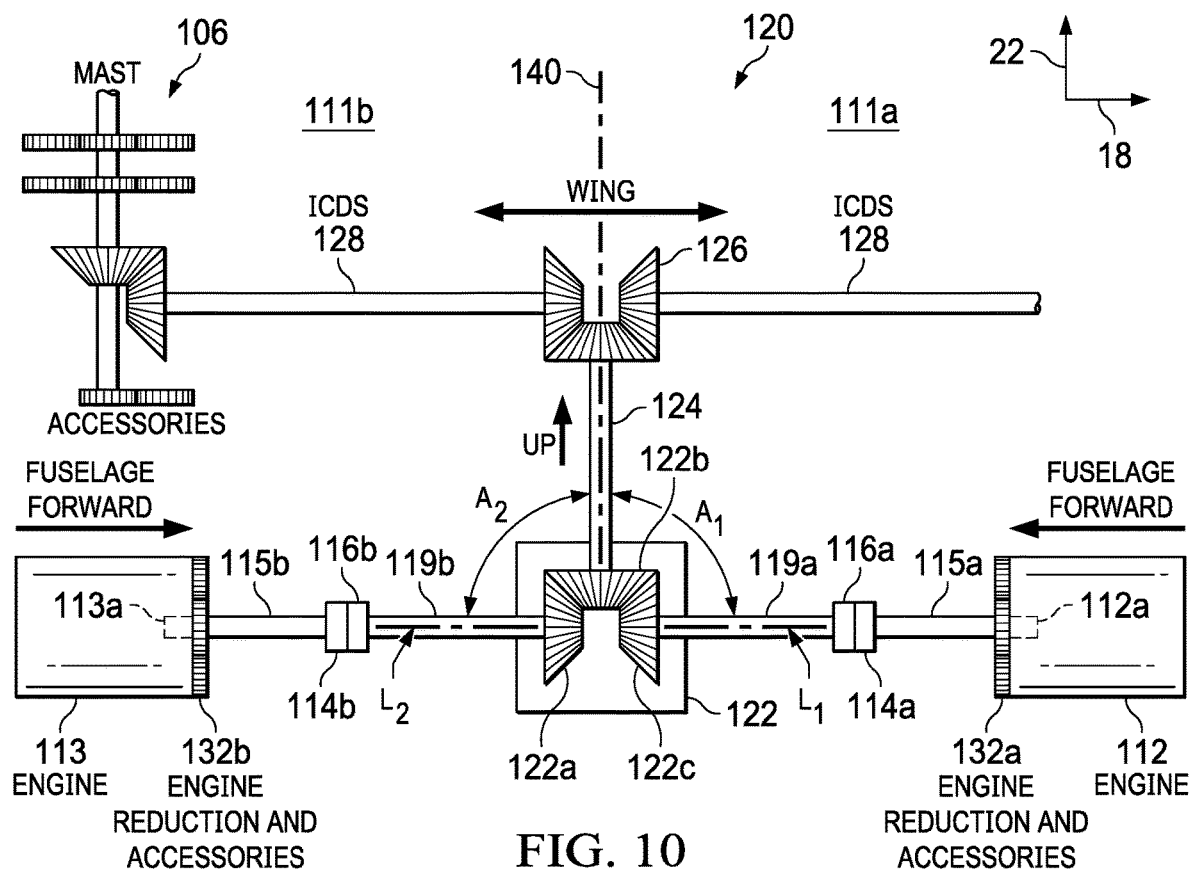
FIG. 10 is another partial schematic diagram of a drive system of the aircraft of FIG. 1.
Figure 11:
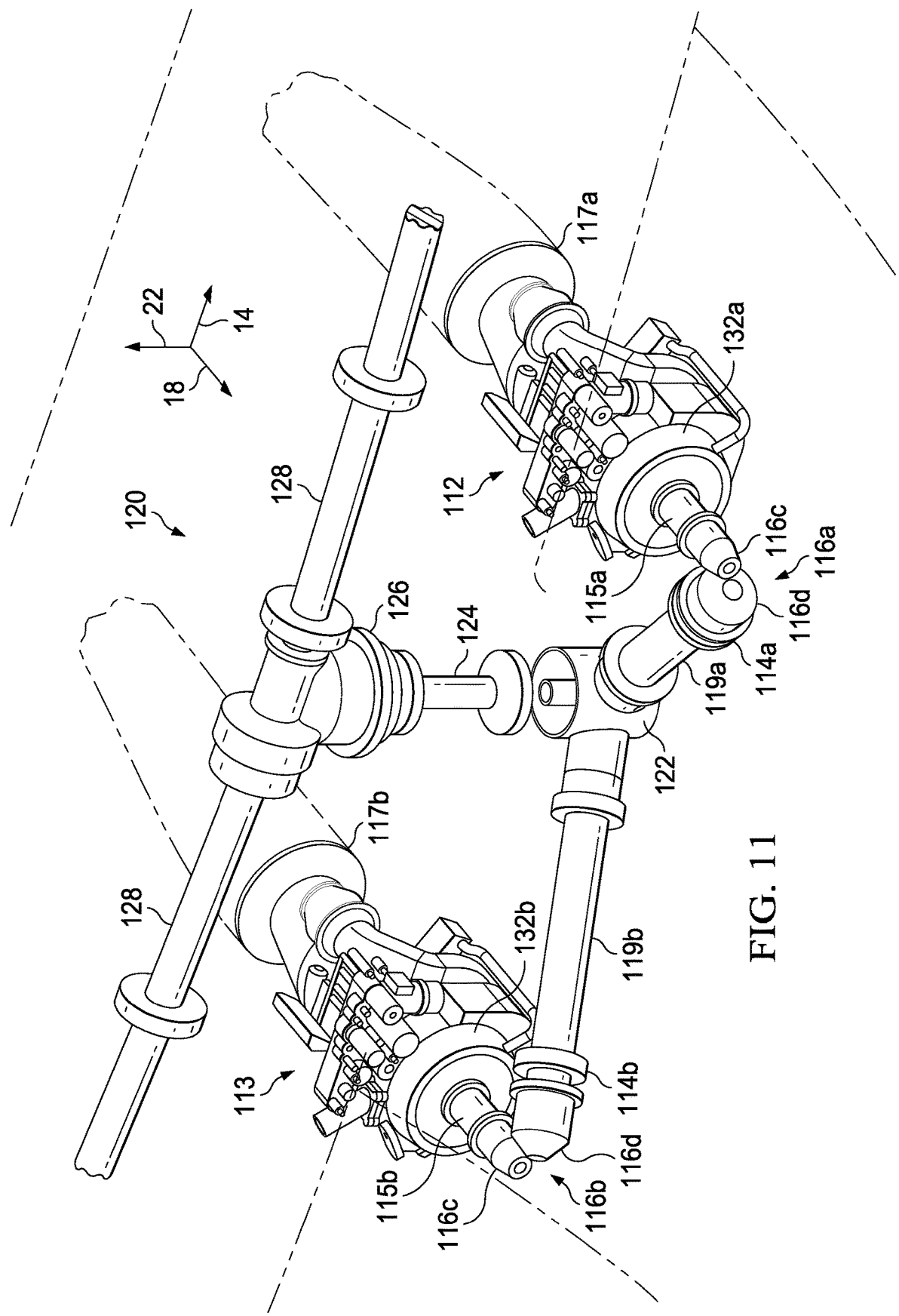
FIG. 11 is an oblique top right view of a drive system of the aircraft of FIG. 1.

In an exemplary embodiment, as shown in FIGS. 10-11, first and second engines 112, 113 can each include engine reduction gear components and/or accessories 132a, 132b adjacent thereto and having the first and second engine output shafts 115a, 115b extending therefrom. In some embodiments, shown in FIG. 10, a first splined drive shaft and second splined drive shaft 112a, 113a can connect the first and second engines 112, 113 with the respective engine reduction gear components and/or accessories 132a, 132b.

Referring to FIG. 10, in an exemplary embodiment, the drive system 120 comprises first and second engine output shafts 115a, 115b that extend from the respective first and second engines 112, 113 substantially forward toward the front of the aircraft 100. The first and second engine output shafts 115a, 115b transfer power by a first connection member and a second connection member 116a, 116b (first and second connection members 116a, 116b are each schematically represented by a box in FIG. 10) to a first coupling shaft 119a and a second coupling shaft 119b, respectively. In an exemplary embodiment shown in FIGS. 11-12, the first and second connection members 116a, 116b are each a spiral gearbox that includes a spiral bevel input gear 116c and a spiral bevel output gear 116d. The spiral bevel gears 116c, 116d change power direction from the longitudinal axis of the first and second engine output shafts 115a, 115b to the longitudinal axis $L_1$, $L_2$ of the first and second coupling shafts 119a, 119b, respectively. It should be noted that the configuration of the first and second connection members 116a, 116b is merely an example and that other configurations could be used. For example, the first and second connection members 116a, 116b can be comprised of flexible diagram couplings, splined couplings, and/or gear tooth type couplings.

Moreover, it should be appreciated that the first and second connection members 116a, 116b can include additional or different components including bearing systems, lubrications systems, and other gearbox related systems that may be beneficial for operation. In an embodiment, the first and second connection members 116a, 116b respectively include a first clutch 114a and a second clutch 114b. In an exemplary embodiment, the first clutch 114a and the second clutch 114b can respectively be associated with the first and second engine output shafts 115a, 115b, as shown in FIG. 10; and/or associated with the first and second coupling shafts 119a, 119b, as shown in FIG. 11. Engines 112, 113 provide mechanical energy to the engine output shafts 115a, 115b. If, in one example scenario, the first or second engine 112, 113 jams or otherwise fails to work properly, the respective first or second clutch 114a, 114b disengages either the engine output shaft 115a, 115b or the coupling shaft 119a, 119b of the non-working engine, which permits the working engine to solely transfer power to a combining gearbox 122 to power the aircraft 100 during flight (e.g., the first and second clutches 114a,114b prevent the combining gearbox 122 from jamming).

The first and second coupling shafts 119a, 119b are connected to the combining gearbox 122 disposed within the fuselage 102. The first and second coupling shafts 119a, 119b are oriented laterally in respect to the combining gearbox 122. In an exemplary embodiment, the first coupling shaft 119a extends in the right lateral portion 111a (e.g., a right coupling shaft that is right of the zero butt line 111) and the second coupling shaft 119b extends in the left lateral portion 111b (e.g., a left coupling shaft that is left of the zero butt line 111). In an exemplary embodiment, the first coupling shaft 119a is integral with a first gear 122a in the combining gearbox 122. Similarly, the second coupling shaft 119b is integral with the second gear 122b in the combining gearbox 122. In other embodiments, the first and second coupling shafts 119a, 119b are connected to the respective first and second gear 122a, 122b using a conventional flexible coupling.

The combining gearbox 122 in turn is connected to a riser (output) shaft 124 that extends substantially vertically from the combining gearbox 122 to a mid-wing gearbox 126. The combining gearbox 122 includes a first gear 122a, a second gear 122b, and a third gear 122c. In exemplary embodiment, some or all of the first, second, and third gears 122a, 122b, 122c are bevel gears. The combining gearbox 122 is configured to transfer rotary motion between the first and second coupling shafts 119a, 119b via first and second gears 122a, 122b and the riser shaft 124 via the third gear 122c despite the angle (e.g., a first angle $A_1$, a second angle $A_2$, a third angle $A_3$, a fourth angle $A_4$) between the first and second coupling shafts 119a, 119b and the riser shaft 124. In some embodiments, the combining gearbox 122, riser shaft 124, and mid-wing gearbox 126 are disposed along the rotation axis 140 of the rotatable wing 104. Further, the combining gearbox 122 is so configured that one or both of the first and second engines 112, 113 can drive the riser shaft 124 when a failure of one of the first and second engines 112, 113 occurs.

The mid-wing gearbox 126 receives rotation from the riser shaft 124 and transfers rotary motion to each of two interconnect cross-wing driveshafts 128 that drive the rotor systems 106. In an exemplary embodiment, the mid-wing gearbox 126 is disposed in the middle of rotatable wing 104. It should be noted that in some aircraft configurations, the mid-wing gearbox 126 may be located at other positions along the span of the rotatable wing 104 (e.g., positions between the fuselage 102 and the wing extensions 108). The mid-wing gearbox 126 of the drive system 120 is configured to receive rotation from the riser shaft 124 and transfer rotary motion to each of two interconnect cross-wing driveshafts 128 that drive the rotor systems 106. In some embodiments, the mid-wing gearbox comprises a power splitting gearbox (MWGB) to this end. Further, in some embodiments, the mid-wing gearbox 126 can be configured to provide a shaft speed reduction so that the speed of the riser shaft 124 is slower than the speed of the engine output shafts 112, 113.

In an exemplary embodiment, some or all of the engine reduction gear components 132a, 132b; first and second connection members 116a, 116b; combining gearbox 122; and the mid-wing gearbox 126 can be connected using bolted flanges and flexible couplings to the associated shafts (e.g., first and second engine output shafts 115a, 115b; first and second coupling shafts 119a, 119b). The flexible couplings allow relative movement in the drive system 120 that occurs during operation of the aircraft 100.

In some embodiments, the first and second coupling shafts 119a, 119b of the drive system 120 can be designed to define particular angles with the riser shaft 124. In an exemplary embodiment, schematically shown in FIG. 9, a first angle $A_1$ defined by the first coupling shaft 119a along the transverse axis 18 and the riser shaft 124 being variable from about 0 degrees to about 180 degrees. In an embodiment, the first angle $A_1$ defined by the first coupling shaft 119a along the transverse axis 18 and the riser shaft 124 being variable from greater than 0 degrees to less than 180 degrees. In some embodiments, the first angle $A_1$ defined by the first coupling shaft 119a along the transverse axis 18 and the riser shaft 124 being variable from about 10 degrees to about 90 degrees.

Figure 9:
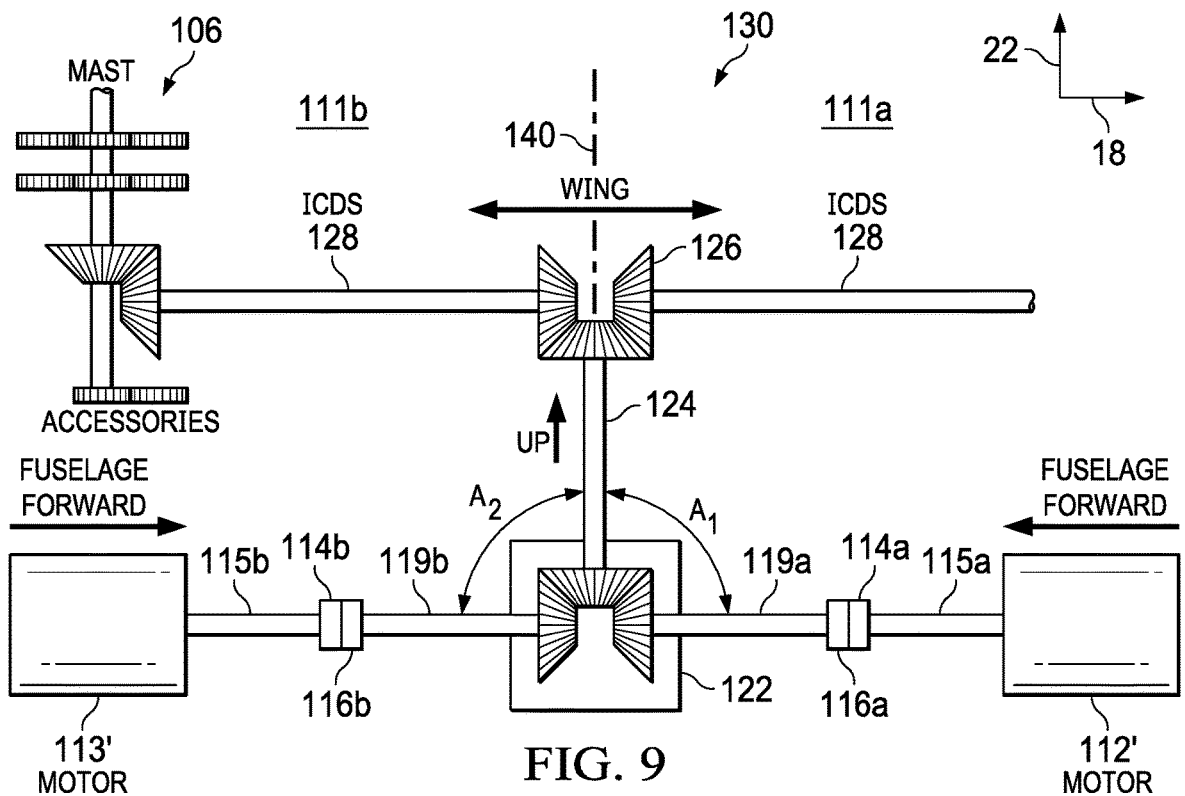
FIG. 9 is a partial schematic diagram of a drive system of the aircraft of FIG. 1.

In an exemplary embodiment, schematically shown in FIG. 9, a second angle $A_2$ along the transverse axis 18 defined by the second coupling shaft 119b and the riser shaft 124 being variable from about 0 degrees to about 180 degrees. In an embodiment, the second angle $A_2$ defined by the second coupling shaft 119a along the transverse axis 18 and the riser shaft 124 being variable from greater than 0 degrees to less than 180 degrees. In some embodiments, the second angle $A_2$ defined by the second coupling shaft 119a along the transverse axis 18 and the riser shaft 124 being variable from about 10 degrees to about 90 degrees.

Figure 12:
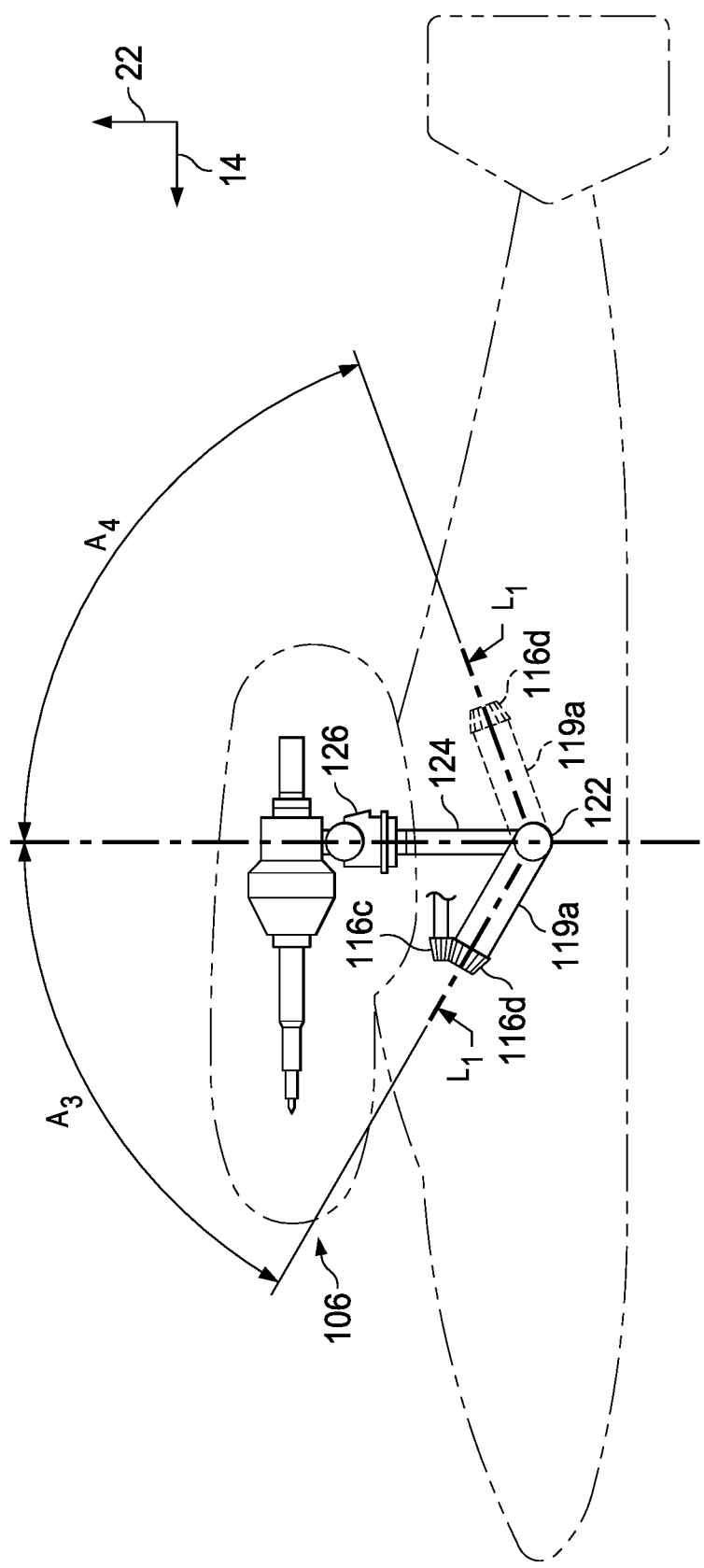
FIG. 12 is a partial, schematic side view of a drive system of the aircraft of FIG. 1.

In an exemplary embodiment, schematically shown in FIG. 12, a third angle $A_3$ defined by the first coupling shaft 119a along the longitudinal axis 14 and the riser shaft 124 being variable from about 0 degrees to about 180 degrees. In an exemplary embodiment, schematically shown in FIG. 12, a third angle $A_3$ defined by the first coupling shaft 119a along the longitudinal axis 14 and the riser shaft 124 being variable from about 0 degrees to about 180 degrees. In an embodiment, the third angle $A_3$ defined by the first coupling shaft 119a along the longitudinal axis 14 and the riser shaft 124 being variable from greater than 0 degrees to less than 180 degrees. In some embodiments, the third angle $A_3$ defined by the first coupling shaft 119a along the longitudinal axis 14 and the riser shaft 124 being variable from about 10 degrees to about 90 degrees. In an exemplary embodiment, schematically shown in FIG. 12, a fourth angle $A_4$ along the longitudinal axis 14 defined by the first coupling shaft 119a and the shaft 124 being variable from about 0 to about 180 degrees. In an exemplary embodiment, schematically shown in FIG. 12, a fourth angle $A_4$ defined by the first coupling shaft 119a along the longitudinal axis 14 and the riser shaft 124 being variable from about 0 degrees to about 180 degrees. In an embodiment, the fourth angle $A_4$ defined by the first coupling shaft 119a along the longitudinal axis 14 and the riser shaft 124 being variable from greater than 0 degrees to less than 180 degrees. In some embodiments, the fourth angle $A_4$ defined by the first coupling shaft 119a along the longitudinal axis 14 and the riser shaft 124 being variable from about 10 degrees to about 90 degrees. In some embodiments, the second coupling shaft 119b can be oriented substantially symmetrically to the first coupling shaft 119a; therefore, for sake of efficiency the third and fourth angles $A_3$, $A_4$ are only disclosed with regard to the first coupling shaft 119a above. However, one of ordinary skill in the art would fully appreciate an understanding of the orientation of the second coupling shaft 119b based upon the disclosure herein of the first coupling shaft 119a.

To this end, use of the combining gearbox 122 and the associated first and second coupling shafts 119a, 119b to the engine output shafts 115a, 115b enables upward/downward adjustment and fore/aft adjustment of the design locations of the engines on the fuselage in order to adjust the CG (center of gravity) for the aircraft. For example, the design of the aircraft with a rotatable wing 104 is facilitated since the position of the combining gearbox 122 can be initially set by design of the rotatable wing 104 followed by adjustment of the first and second coupling shafts 119a, 119b and the engine 112, 113 locations to achieve a desired CG. Accordingly, the drive system 120 described herein can provide cost and time savings in the design of the aircraft with a rotatable wing 104, while reducing CG weight inefficiencies that can occur from duplicative engines.

Referring now to FIG. 9, an alternative embodiment of a drive system 130 is shown. The drive system 130 of FIG. 9 is substantially similar to the drive system 120, but some or all of the engines 112, 113 may be electrical motors 112', 113' supplied with power from a common electrical source integral to the aircraft 100. In an embodiment, the drive system 130 does not include engine reduction gear components and/or accessories Practice of the invention is advantageous in that in flight operations the dual engines and associated coupling shafts/combining gearbox provide engine redundancy, more engine power, and/or increased flight time and range. Moreover, in some embodiments, the aircraft described above can be manipulated (folded) to a stowable compact package for fitting in a standard cargo container. Further, use of the first and second coupling shafts and the combining gearbox together with the associated riser shaft enables upward/downward and fore/aft adjustment of the design locations of the engines on the fuselage in order to adjust the CG (center of gravity) for the aircraft, which can reduce engineering costs and production time. The dual engines mounted on the fuselage are easily accessed by removing side panels in the fuselage. Maintenance and inspection of the engines and drive system are critical for the operation of the aircraft, as such, safety and efficiency of operation is improved by increasing the ease for which the dual engines can be inspected.

It may be advantageous to set forth definitions of certain words and phrases used in this patent document. The terms "a" and "an" are defined as one or more unless this disclosure explicitly requires otherwise. Terms such as "first," "second," "third," and "fourth" are used only to differentiate features and not to limit the different features to a particular order or to a particular quantity. The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. An aircraft, comprising:
    a fuselage;
    a rotatable wing disposed above the fuselage, the wing being rotatable between a stowed position that is substantially parallel to the longitudinal axis of the fuselage and a flight position such that the rotatable wing is substantially perpendicular to the longitudinal axis of the fuselage;
    at least one cross-wing driveshaft disposed within the wing;
    a first engine and a second engine located at a respective right side and left side of the fuselage beneath the wing; and
    a drive system between the first engine and the second engine and the at least one cross-wing driveshaft, wherein the drive system includes:
        a combining gearbox that is disposed inside the fuselage and that is connected to a first engine driveshaft and a second engine driveshaft by a respective first coupling shaft and second coupling shaft, the combining gearbox including a riser shaft; and
        a mid-wing gearbox connected between the riser shaft and the at least one cross-wing driveshaft;
    wherein the first coupling shaft and the second coupling shaft are disposed forward of the riser shaft.

2. The aircraft of claim 1, wherein at least one of the first coupling shaft and the second coupling shaft define an angle with the riser shaft from about 0 degrees to about 180 degrees relative to the transverse axis of the aircraft.

3. The aircraft of claim 1, wherein at least one of the first coupling shaft and the second coupling shaft define an angle with the riser shaft from about 0 degrees to about 180 degrees relative to the longitudinal axis of the aircraft.

4. The aircraft of claim 1, wherein at least a portion of the respective first engine and the second engine are located externally at opposite sides of the fuselage.

5. The aircraft of claim 1, wherein the first engine and the second engine are symmetrically disposed relative to a zero butt line of the aircraft.

6. The aircraft of claim 1, wherein the first coupling shaft and the second coupling shaft are symmetrically disposed relative to a zero butt line.

7. The aircraft of claim 1, wherein the mid-wing gearbox is a power splitting gearbox disposed between the riser shaft and the at least one cross-wing driveshaft.

8. The aircraft of claim 1, wherein the wing is rotatable about a wing rotation axis.

9. The aircraft of claim 8, wherein the riser shaft of the combining gearbox is disposed along the wing rotation axis.

10. The aircraft of claim 1, wherein the first engine and the second engine are mounted on a support frame attached to the fuselage.

11. The aircraft of claim 1, which is a tiltrotor aircraft.

12. The aircraft of claim 1, which is an unmanned aerial vehicle.

13. The aircraft of claim 1, wherein at least one of the first engine and the second engine comprises an electrical motor.

14. The aircraft of claim 13, wherein the electrical motor is supplied with power from a common electrical source integral to the aircraft.

\* \* \* \* \*